United States Patent
Lo

(10) Patent No.: US 10,237,992 B2
(45) Date of Patent: Mar. 19, 2019

(54) ELECTRONIC DEVICE HOUSING

(71) Applicant: PEGATRON CORPORATION, Taipei (TW)

(72) Inventor: Chien-Sheng Lo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/891,489

(22) Filed: Feb. 8, 2018

(65) Prior Publication Data

US 2018/0270966 A1    Sep. 20, 2018

(30) Foreign Application Priority Data

Mar. 16, 2017  (CN) ..................... 2017 2 0256298 U

(51) Int. Cl.
*G06F 1/16*   (2006.01)
*H05K 5/02*   (2006.01)

(52) U.S. Cl.
CPC ............ *H05K 5/02* (2013.01); *G06F 1/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,329,427 A * | 7/1994 | Hogdahl | ................... | G06F 1/16 361/728 |
| 8,068,331 B2 * | 11/2011 | Sauers | .................. | G06F 1/1626 206/305 |
| 8,873,226 B1 * | 10/2014 | Peters | ................... | G06F 1/1613 361/679.01 |
| 8,973,753 B2 * | 3/2015 | Rayner | ................. | G06F 1/1626 206/320 |
| 9,202,398 B2 * | 12/2015 | Jung | ........................ | H05K 5/02 |
| 2010/0112326 A1 * | 5/2010 | Tsai | .................. | B29C 45/14786 428/221 |
| 2013/0265698 A1 * | 10/2013 | Baum | ................... | H05K 5/0213 361/679.01 |
| 2014/0016217 A1 * | 1/2014 | Rayner | ................. | G06F 1/1626 359/819 |

* cited by examiner

*Primary Examiner* — Lisa Lea-Edmonds
(74) *Attorney, Agent, or Firm* — McClure, Qualey & Rodack, LLP

(57) ABSTRACT

An electronic device housing includes a first housing, a second housing, and a foaming buffer unit. The first housing has a first inner surface, and the first inner surface has a first abutting area. The second housing has a second inner surface, where the second inner surface has a second abutting area, the second housing is connected to the first housing, and the second inner surface is opposite to the first inner surface. The foaming buffer unit is disposed between the first inner surface and the second inner surface, and abuts against the first abutting area of the first inner surface and the second abutting area of the second inner surface.

8 Claims, 2 Drawing Sheets

ELECTRONIC DEVICE HOUSING

CROSS-REFERENCE TO RELATED APPLICATION

This non-provisional application claims priority under 35 U.S.C. § 119(a) to Patent Application No. 201720256298.1 filed in China, P.R.C. on Mar. 16, 2017, the entire contents of which are hereby incorporated by reference.

BACKGROUND

Technical Field

The present invention is related to a housing of an electronic device.

Related Art

With spread of portable electronic devices, no matter notebook computers, tablet computers, or smart phones, it is a common phenomenon that a person carries a portable electronic device. However, based on requirements for carrying, "light-weighting" has become one of the important factors that affect consumers in purchasing the portable electronic devices.

With rapid development of technologies, volumes of various electronic components within the electronic device also become smaller. However, although the volumes of the electronic components within the electronic device become smaller, to embrace convenience of use of the electronic device, a housing of the electronic device is still limited by configuration of a display or a keyboard, and needs to be kept at a considerable size. In this way, a lot of space inside a housing is obtained as compared with a conventional housing in a case where the housing keeps unchanged while the volumes of the inner electronic components are reduced. An inner space of the housing enables a compressive strength of the housing to be significantly reduced, so as to affect life of the electronic device.

Moreover, an objective of ensuring that the housing of the electronic device can keep the required structural strength is usually achieved by changing the material of the housing or by disposing a reinforcement rib in the inner space of the housing. Increasing the strength of the housing by changing the material thereof may usually increase costs and weight. Moreover, a configuration position and a quantity need to be planned in advance by using the method of disposing a reinforcement rib, so as to avoid limitations to applicability of the inner electronic components. In this way, the defect of the difficulty in compensating for weakness in the structural strength still exists due to limitations in setting a position and quantity of the reinforcement ribs.

SUMMARY

The present invention relates to an electronic device housing, and a main objective thereof is to improve strength of the electronic device housing.

To achieve the foregoing objective, the present invention discloses an electronic device housing, including a first housing, a second housing, and a foaming buffer unit. The first housing has a first inner surface, and the first inner surface has a first abutting area. The second housing has a second inner surface, where the second inner surface has a second abutting area, the second housing is connected to the first housing, and the second inner surface is opposite to the first inner surface. The foaming buffer unit is disposed between the first inner surface and the second inner surface, and abuts against the first abutting area of the first inner surface and the second abutting area of the second inner surface.

Another concept of the present invention is that in the electronic device housing, an area of the first abutting area takes up 30-100% of an area of the first inner surface, and an area of the second abutting area takes up 30-100% of an area of the second inner surface.

Another concept of the present invention is that in the electronic device housing, a range of the first abutting area covers a portion of the first inner surface, a range of the second abutting area covers a portion of the second inner surface, the foaming buffer unit includes a first foaming buffer member, the first foaming buffer member has a first outer surface, and the first outer surface of the first foaming buffer member abuts against the first abutting area and the second abutting area.

Another concept of the present invention is that in the electronic device housing, a range of the first abutting area covers the entire first inner surface, a range of the second abutting area covers the entire second inner surface, the foaming buffer unit includes a first foaming buffer member, the first foaming buffer member has a first outer surface, and the first outer surface of the first foaming buffer member abuts against the first abutting area and the second abutting area.

Another concept of the present invention is that in the electronic device housing, the foaming buffer unit further includes a second foaming buffer member and a third foaming buffer member, the second foaming buffer member has a second outer surface, the third foaming buffer member has a third outer surface, a portion of the second outer surface abuts against the first abutting area of the first inner surface and the third outer surface, and a portion of the third outer surface abuts against the second abutting area of the second inner surface and the second outer surface.

Another concept of the present invention is that in the electronic device housing, the foaming buffer unit further includes a fourth foaming buffer member, the fourth foaming buffer member has a fourth outer surface, a first electronic component is accommodated between the first housing and the second housing, the first electronic component is fixed at the second inner surface, and a portion of the fourth outer surface of the fourth foaming buffer member abuts against the first abutting area of the first inner surface and the first electronic component.

Another concept of the present invention is that in the electronic device housing, the foaming buffer unit further includes a fifth foaming buffer member, the fifth foaming buffer member has a fifth outer surface, a second electronic component is accommodated between the first housing and the second housing, and a portion of the fifth outer surface of the fifth foaming buffer member abuts against the second abutting area of the second inner surface and the second electronic component.

Another concept of the present invention is that in the electronic device housing, the foaming buffer unit further includes a seventh foaming buffer member, the seventh foaming buffer member has a seventh outer surface, a fourth electronic component and a fifth electronic component are accommodated between the first housing and the second housing, and a portion of the seventh outer surface of the seventh foaming buffer member abuts against the fourth electronic component and the fifth electronic component.

Another concept of the present invention is that in the electronic device housing, the first abutting area and the second abutting area respectively include a plurality of abutting blocks.

On this basis, the first housing and the second housing abut against the foaming buffer unit, and the foaming buffer unit supports the first housing and the second housing, so as to improve strength of the electronic device housing.

Specific implementations and other advantages and effects of the present invention are described below with reference to the figures.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show merely some embodiments disclosed in this application, and a person of ordinary skill in the art may still derive other drawings from these accompanying drawings without creative efforts.

DETAILED DESCRIPTION

Figure 1:
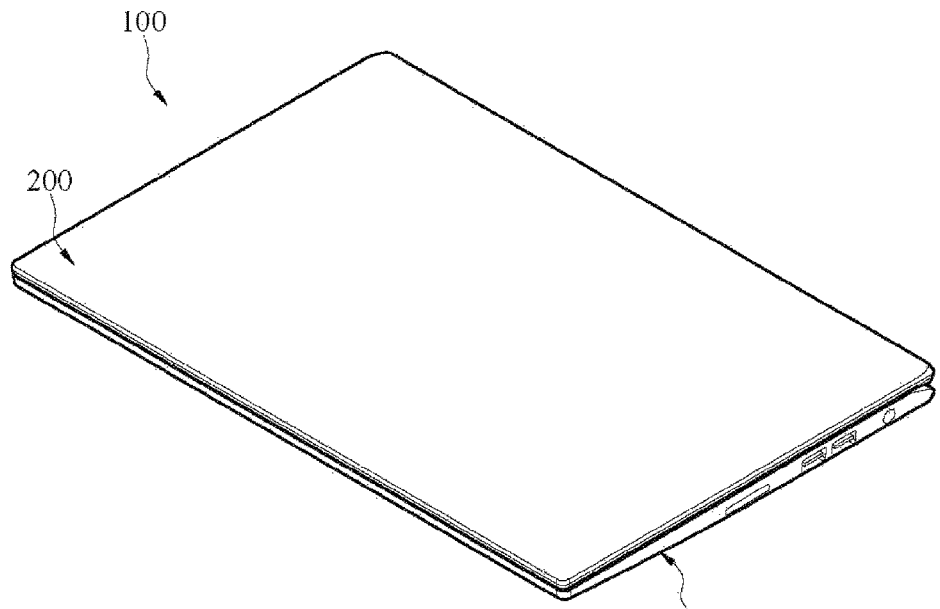
FIG. 1 is a schematic diagram of an electronic device having an electronic device housing.
Figure 2:
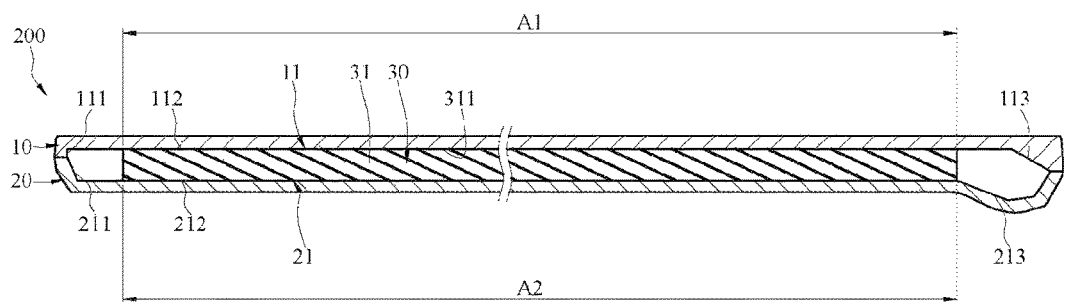
FIG. 2 is a schematic cross-sectional view of an embodiment of this novel electronic device housing.

Referring to FIG. 1 in combination with FIG. 2, FIG. 1 is a schematic diagram of an embodiment of an electronic device. FIG. 2 is a partial cross-sectional view of an embodiment of an electronic device housing in FIG. 1. An electronic device 100 may be a notebook computer or a tablet computer. The electronic device 100 drawn in FIG. 1 is a notebook computer. An electronic device housing 200 may be a housing of a host of a notebook computer or a housing of a display of a notebook computer. The electronic device housing 200 includes a first housing 10 and a second housing 20. The first housing 10 is connected to the second housing 20. A foaming buffer unit 30 is disposed between the first housing 10 and the second housing 20. A portion of the foaming buffer unit 30 abuts against the first housing 10 and the second housing 20 to support the first housing 10 and the second housing 20, thereby improving strength of the electronic device housing 200.

Referring to FIG. 2, the first housing 10 has a first inner surface 11. In an embodiment, the first inner surface 11 includes a first surface portion 111, a second surface portion 112, and a third surface portion 113 that are sequentially connected. A position at which the first surface portion 111 is connected to the second surface portion 112 has a first included angle, and a position at which the third surface portion 113 is connected to the second surface portion 112 has a second included angle. In an embodiment, the first included angle is not equal to 90 degrees, but is not limited thereto, and the second included angle is equal to 90 degrees, but is not limited thereto. In addition, the first inner surface 11 has a first abutting area A1. An area of the first abutting area A1 takes up 30-100% of an area of the first inner surface 11. A range of the first abutting area A1 covers one or a combination of the first surface portion 111, the second surface portion 112, and the third surface portion 113.

Referring to FIG., the second housing 20 has a second inner surface 21. In an embodiment, the second inner surface 21 includes a fourth surface portion 211, a fifth surface portion 212, and a sixth surface portion 213 that are sequentially connected. In an embodiment, each surface portion may be a single plane, a composite plane, a curved surface, or a combination thereof. In this example, the sixth surface portion 213 is a composite plane composed of a plurality of planes. Herein, a position at which the fourth surface portion 211 is connected to the fifth surface portion 212 has a third included angle, and a position at which the sixth surface portion 213 is connected to the fifth surface portion 212 has a fourth included angle. In an embodiment, the third included angle is not equal to 90 degrees, but is not limited thereto, and the fourth included angle is equal to 90 degrees, but is not limited thereto. The second housing 20 is connected to the first housing 10, and the second inner surface 21 is opposite to the first inner surface 11. In an embodiment, the second surface portion 112 of the first inner surface 11 is opposite to the fifth surface portion 212 of the second inner surface 21. In addition, the second inner surface 21 has a second abutting area A2. An area of the second abutting area A2 takes up 30-100% of an area of the second inner surface 21. A range of the second abutting area A2 covers one or a combination of the fourth surface portion 211, the fifth surface portion 212, and the sixth surface portion 213.

Referring to FIG. 2, the foaming buffer unit 30 includes a first foaming buffer member 31. The first foaming buffer member 31 has a first outer surface 311. In an embodiment, a shape of the first outer surface 311 is an elongated cube, but is not limited thereto.

Referring to FIG. 2, the first abutting area A1 of the first inner surface 11 abuts against the first outer surface 311 of the first foaming buffer member 31. The second abutting area A2 of the second inner surface 21 abuts against the first outer surface 311 of the first foaming buffer member 31. In an embodiment, the range of the first abutting area A1 covers the second surface portion 112, and the range of the second abutting area A2 covers the fifth surface portion 212. The first outer surface 311 of the first foaming buffer member 31 abuts against the first abutting area A1 of the second surface portion 112 of the first inner surface 11, and abuts against the second abutting area A2 of the fifth surface portion 212 of the second inner surface 21. However, the first outer surface 311 of the first foaming buffer member 31 does not contact the first surface portion 111 and the third surface portion 113 of the first inner surface 11 or the fourth surface portion 211 and the sixth surface portion 213 of the second inner surface 21. On this basis, the first housing 10 and the second housing 20 both abut against the first foaming buffer member 31. The first foaming buffer member 31 provides stable support between the first housing 10 and the second housing 20, so as to improve the strength of the electronic device housing 200.

Figure 3:
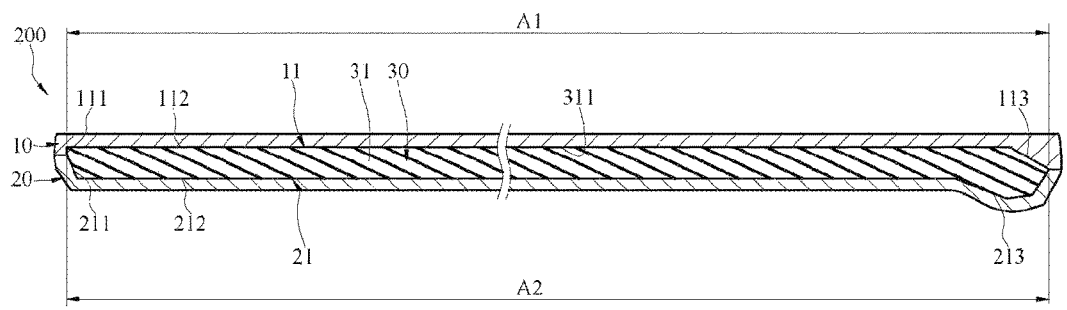
FIG. 3 is a schematic cross-sectional view of another embodiment of this novel electronic device housing.

Referring to FIG. 3, the shape of the first outer surface 311 of the first foaming buffer member 31 is not limited to the foregoing embodiments. In an embodiment, the shape of the first outer surface 311 of the first foaming buffer member 31 corresponds to a shape that the first inner surface 11 butts the second inner surface 21. Herein, the range of the first abutting area A1 of the first inner surface 11 of the first housing 10 covers the first surface portion 111, the second surface portion 112, and the third surface portion 113, and the range of the second abutting area A2 of the second inner surface 21 of the second housing 20 covers the fourth surface portion 211, the fifth surface portion 212, and the sixth surface portion 213. When the first foaming buffer member 31 abuts against the first abutting area A1 and the second abutting area A2, the first surface portion 111, the second surface portion 112, and the third surface portion 113 of the first inner surface 11 of the first housing 10, and the fourth surface portion 211, the fifth surface portion 212, and the sixth surface portion 213 of the second inner surface 21 of the second housing 20 all abut against the first outer surface 311 of the first foaming buffer member 31. In this way, interiors of the first housing 10 and the second housing 20 of the electronic device housing 200 are fully supported, so as to provide best effects for improving the strength.

Further, the first abutting area A1 and the second abutting area A2 in FIG. 2 and FIG. 3 are respectively in single and continuous ranges, but are not limited thereto. Further referring to FIG. 4, in an embodiment, the foaming buffer unit 30 may further include a second foaming buffer member 32 and a third foaming buffer member 33 in addition to the first foaming buffer member 31. In this example, the first abutting area A1 includes a first abutting block A11 and a second abutting block A12, and the second abutting area A2 includes a third abutting block A21 and a fourth abutting block A22. The first abutting block A11 of the first abutting area A1 and the third abutting block A21 of the second abutting area A2 abut against the first foaming buffer member 31. The second foaming buffer member 32 has a second outer surface 321, and the third foaming buffer member 33 has a third outer surface 331. A portion of the second outer surface 321 of the second foaming buffer member 32 abuts against the second abutting block A12 of the first inner surface 11 and the third outer surface 331. A portion of the third outer surface 331 of the third foaming buffer member 33 abuts against the fourth abutting block A22 of the second inner surface 21 and the second outer surface 321. On this basis, when the first inner surface 11 of the first housing 10 or the second inner surface 21 of the second housing 20 is in a composite shape, the foaming buffer unit 30 may be enabled to be filled in the first housing 10 and the second housing 20 more fittingly by combining the first foaming buffer member 31 and the second foaming buffer member 32.

Figure 4:
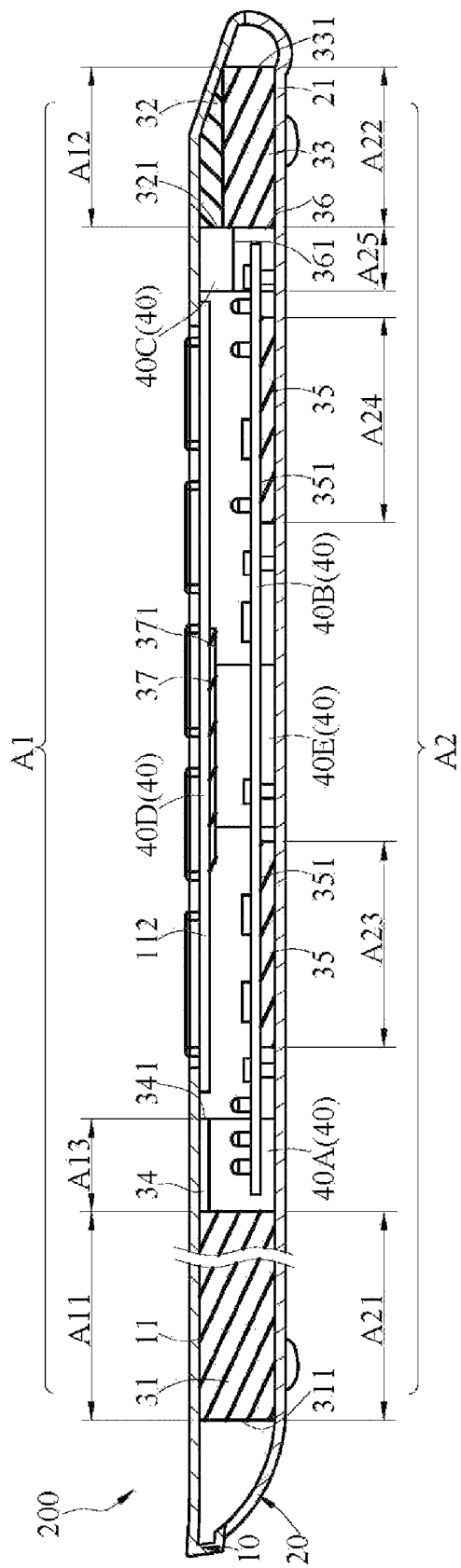
FIG. 4 is a schematic cross-sectional view of still another embodiment of this novel electronic device housing.

Referring to FIG. 4, an electronic component 40 is accommodated between the first housing 10 and the second housing 20 of the electronic device housing 200. The electronic component 40 may be fixed at the first inner surface 11 of the first housing 10, or may be fixed at the second inner surface 21 of the second housing 20, or is first combined with the foaming buffer unit 30 and is then fixed at the first inner surface 11 or the second inner surface 21.

In an embodiment, the electronic component 40 includes a first electronic component 40A, and the first electronic component 40A is fixed at the second inner surface 21 of the second housing 20. Herein, the foaming buffer unit 30 further includes a fourth foaming buffer member 34, and the first abutting area A1 further includes a fifth abutting block A13. The fourth foaming buffer member 34 has a fourth outer surface 341. A portion of the fourth outer surface 341 abuts against the first inner surface 11 of the first housing 10 and the first electronic component 40A, and the fourth foaming buffer member 34 abuts against the fifth abutting block A13 of the first abutting area A1.

In an embodiment, the electronic component 40 further includes a second electronic component 40B, and a portion of the second electronic component 40B is fixed at the second inner surface 21 of the second housing 20. Herein, the foaming buffer unit 30 further includes two fifth foaming buffer members 35, and the second abutting area A2 further includes a sixth abutting block A23 and a seventh abutting block A24. Each fifth foaming buffer member 35 has a fifth outer surface 351. The fifth foaming buffer member 35 is disposed between the second electronic component 40B and the second housing 20. A portion of the fifth outer surface 351 abuts against the second inner surface 21 of the second housing 20 and the second electronic component 40B. Moreover, the two fifth foaming buffer members 35 respectively abut against the sixth abutting block A23 and the seventh abutting block A24 of the second abutting area A2.

In this embodiment, the first abutting area A1 and the second abutting area A2 may be composed of a plurality of abutting blocks. In this way, the range of the first abutting area A1 of the first inner surface 11 of the first housing 10 may be set according to requirements on assembling the electronic component 40, and the range of the second abutting area A2 of the second inner surface 21 of the second housing 20 may also be set according to requirements on assembling the electronic component 40. Usually a portion of the foaming buffer unit 30 is kept to abut between the first housing 10 and the second housing 20, so that strength of the first housing 10 and the second housing 20 is kept.

Referring to FIG. 4, in an embodiment, the electronic component 40 further includes a third electronic component 40C, and the third electronic component 40C is fixed at the first inner surface 11. Herein, the foaming buffer unit 30 further includes a sixth foaming buffer member 36, and the second abutting area A2 further includes an eighth abutting block A25. Moreover, the sixth foaming buffer member 36 has a sixth outer surface 361. A portion of the sixth outer surface 361 abuts against the second inner surface 21 of the second housing 20 and the third electronic component 40C, and the sixth foaming buffer member 36 abuts against the eighth abutting block A25 of the second abutting area A2. In this way, the strength between the first housing 10 and the second housing 20 is kept through mutual abutting between the sixth foaming buffer member 36 and the third electronic component 40C, and the sixth foaming buffer member 36 can further have shock-proof effects for the third electronic component 40C.

Also referring to FIG. 4, in an embodiment, the electronic component 40 further includes a fourth electronic component 40D and a fifth electronic component 40E. The fourth electronic component 40D is fixed at the first inner surface 11, and the fifth electronic component 40E is fixed at the second inner surface 21. Herein, the foaming buffer unit 30 further includes a seventh foaming buffer member 37, and the seventh foaming buffer member 37 has a seventh outer surface 371. The fourth electronic component 40D and the fifth electronic component 40E abut against the seventh outer surface 371. In this way, the fourth electronic component 40D and the fifth electronic component 40E that are respectively disposed at the first housing 10 and the second housing 20 abut against each other through the seventh foaming buffer member 37, so that the strength between the first housing 10 and the second housing 20 is improved.

In view of the above, in the embodiments of the present invention, the foaming buffer unit 30 is disposed between the first housing 10 and the second housing 20, and the structural strength is improved because the first housing 10 and the second housing 20 are supported by the foaming buffer unit 30.

Although the present invention is disclosed by using the foregoing embodiments, the foregoing embodiments are not intended to limit the present invention. A person skilled in the art may make some variations and modifications without departing from the spirit and scope of the present invention. Therefore, the protection scope of the present invention should fall within the scope defined by the claims of this application.

What is claimed is:

1. An electronic device housing, comprising:
   a first housing having a first inner surface, wherein the first inner surface has a first abutting area, wherein an area of the first abutting area takes up 30-100% of an area of the first inner surface;
   a second housing having a second inner surface, wherein the second inner surface has a second abutting area, wherein an area of the second abutting area takes up 30-100% of an area of the second inner surface, the second housing is connected to the first housing, and the second inner surface is opposite to the first inner surface; and
   a foaming buffer unit disposed between the first inner surface and the second inner surface, and abutting against the first abutting area of the first inner surface and the second abutting area of the second inner surface.

2. The electronic device housing according to claim 1, wherein a range of the first abutting area covers a portion of the first inner surface, a range of the second abutting area covers a portion of the second inner surface, the foaming buffer unit comprises a first foaming buffer member, the first foaming buffer member has a first outer surface, and the first outer surface of the first foaming buffer member abuts against the first abutting area and the second abutting area.

3. The electronic device housing according to claim 2, wherein the foaming buffer unit further comprises a second foaming buffer member and a third foaming buffer member, the second foaming buffer member has a second outer surface, the third foaming buffer member has a third outer surface, a portion of the second outer surface abuts against the first abutting area of the first inner surface and the third outer surface, and a portion of the third outer surface abuts against the second abutting area of the second inner surface and the second outer surface.

4. The electronic device housing according to claim 2, wherein the foaming buffer unit further comprises a fourth foaming buffer member, the fourth foaming buffer member has a fourth outer surface, a first electronic component is accommodated between the first housing and the second housing, the first electronic component is fixed at the second inner surface, and a portion of the fourth outer surface of the fourth foaming buffer member abuts against the first abutting area of the first inner surface and the first electronic component.

5. The electronic device housing according to claim 2, wherein the foaming buffer unit further comprises a fifth foaming buffer member, the fifth foaming buffer member has a fifth outer surface, a second electronic component is accommodated between the first housing and the second housing, and a portion of the fifth outer surface of the fifth foaming buffer member abuts against the second abutting area of the second inner surface and the second electronic component.

6. The electronic device housing according to claim 2, wherein the foaming buffer unit further comprises a seventh foaming buffer member, the seventh foaming buffer member has a seventh outer surface, a fourth electronic component and a fifth electronic component are accommodated between the first housing and the second housing, and a portion of the seventh outer surface of the seventh foaming buffer member abuts against the fourth electronic component and the fifth electronic component.

7. The electronic device housing according to claim 1, wherein the first abutting area and the second abutting area respectively comprise a plurality of abutting blocks.

8. An electronic device housing, comprising:
   a first housing having a first inner surface, wherein the first inner surface has a first abutting area;
   a second housing having a second inner surface, wherein the second inner surface has a second abutting area, the second housing is connected to the first housing, and the second inner surface is opposite to the first inner surface; and
   a foaming buffer unit disposed between the first inner surface and the second inner surface, and abutting against the first abutting area of the first inner surface and the second abutting area of the second inner surface, wherein a range of the first abutting area covers the entire first inner surface, a range of the second abutting area covers the entire second inner surface, the foaming buffer unit comprises a first foaming buffer member, the first foaming buffer member has a first outer surface, and the first outer surface of the first foaming buffer member abuts against the first abutting area and the second abutting area.

* * * * *